May 3, 1927.

G. RAWAK

HEADLIGHT

Filed Feb. 2, 1926

Inventor
George Rawak

By his Attorneys
Dean, Fairbank, Obrieght & Hirsch.

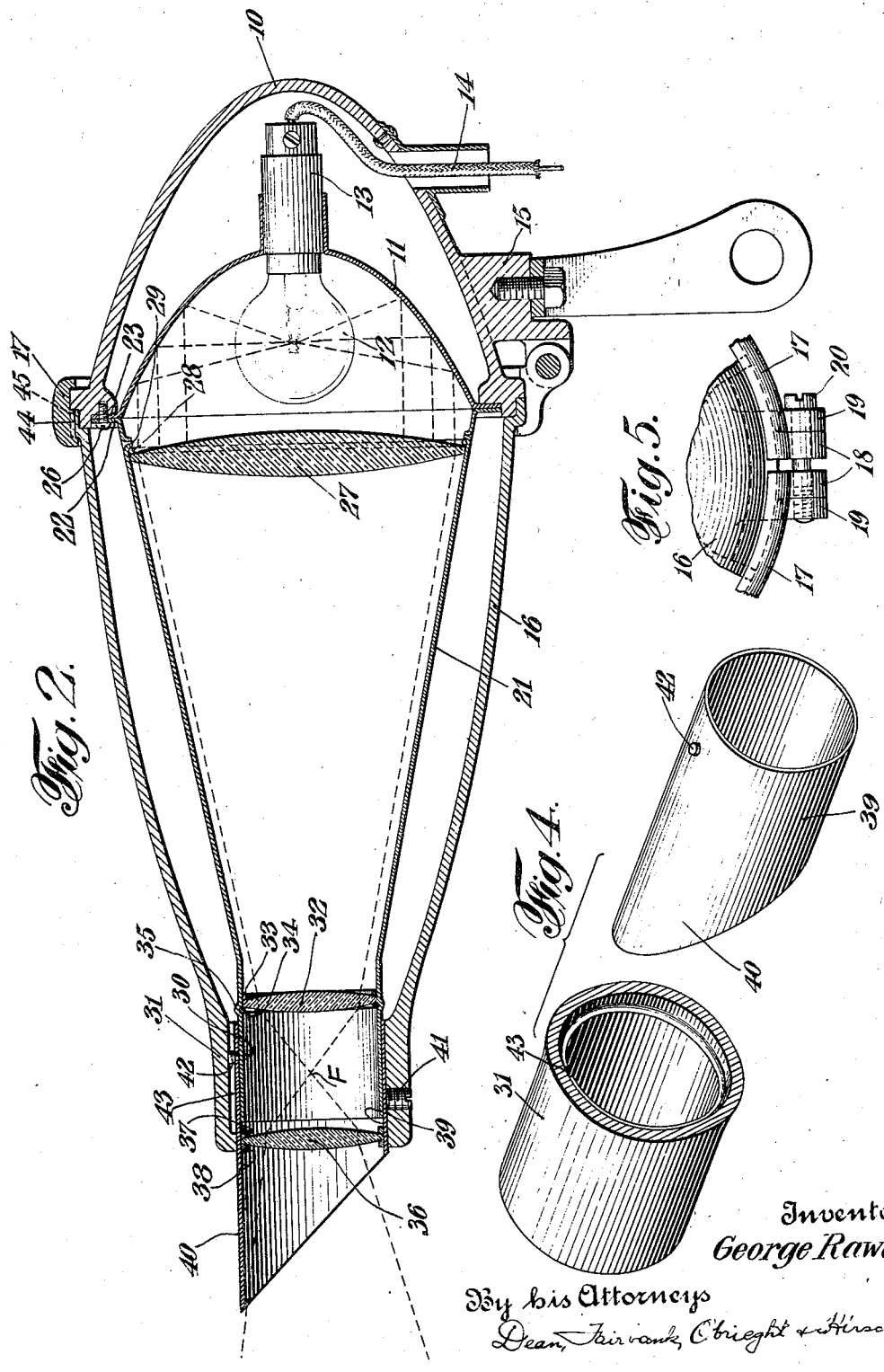

Patented May 3, 1927.

1,626,626

UNITED STATES PATENT OFFICE.

GEORGE RAWAK, OF NEW YORK, N. Y.

HEADLIGHT.

Application filed February 2, 1926. Serial No. 85,437.

It is among the primary objects of the invention to provide a headlight which will project an effective beam so formed as to avoid glare.

Another object is to provide a construction of the type noted which may be executed in an embodiment of simple and rugged construction and at small cost, and which may be readily adapted to headlight constructions already in use without the need for enclosing or otherwise altering the mounting thereof.

According to my invention, I provide a headlight which does not flood the immediate vicinity of the vehicle but projects a restricted beam of light penetrating to a substantial distance and yet so mellow that it does not interfere with the vision even of a person looking directly into it.

In the accompanying drawings in which is shown one of the various possible embodiments of the several features of the invention:

Fig. 2 is a longitudinal sectional view through my headlight on a large scale, Fig. 4 is a perspective view showing the projector lens and visor mount, and;

Fig. 5 is a fragmentary sectional view of the lamp.

Figure 1:
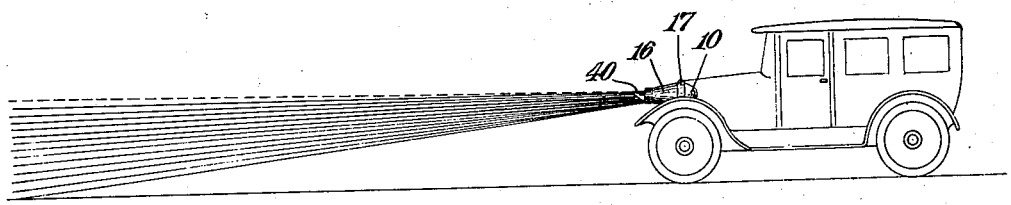
Fig. 1 is a side view on a small scale indicating an automobile with my light in use.
Figure 3:
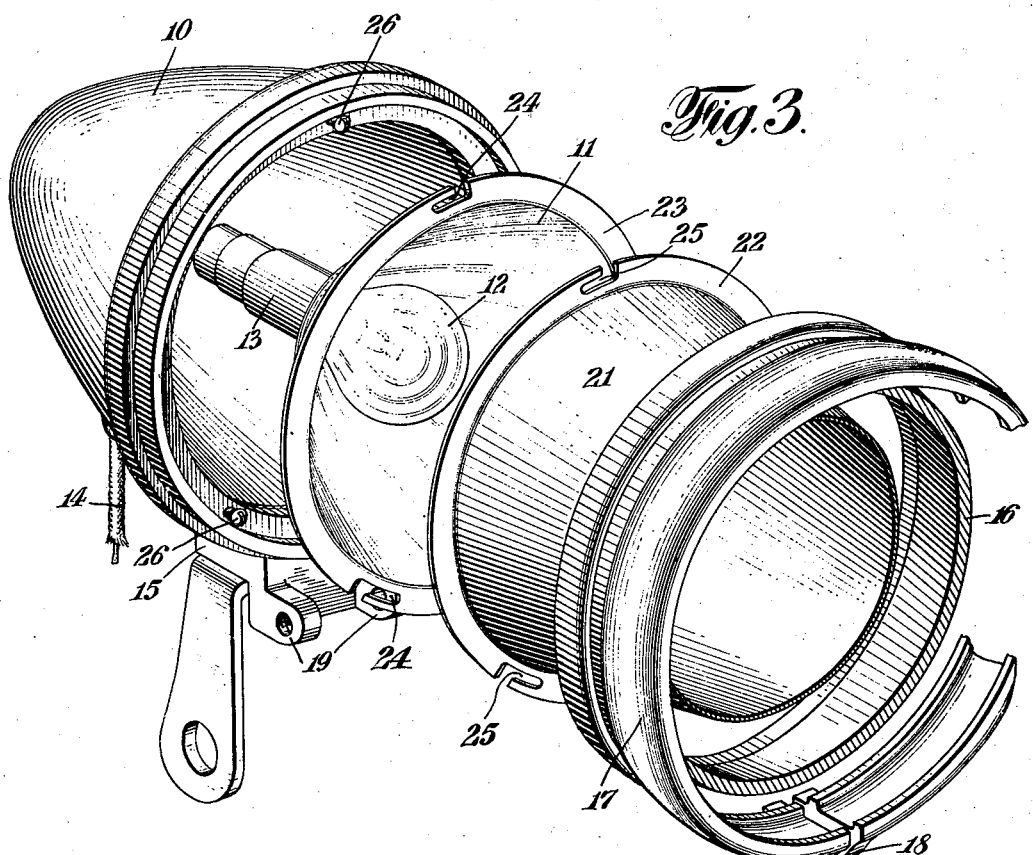
Fig. 3 is an exploded perspective view indicating the assembly of the various parts.

Referring now to the drawings, I have shown a conventional type of headlight casing 10 within which is mounted a common standard type of paraboloidal mirror 11 mounting at the center thereof, the usual headlight lamp bulb 12 the luminous point of which is at the focus of the mirror, and the base 13 of which extends between the mirror and the back of the casing, and is connected to the usual storage battery (not shown), by means of intervening conduits 14. The casing is shown with the usual form of mounting bracket 15 for affixing it to the vehicle.

In the present embodiment the usual glass pane (not shown) in front of the reflector is dispensed with, and in its place there are provided the various elements making up the construction shown. These elements comprise a supplemental casing part or hood 16 of bowed generally conical form which in combination with casing 10 provides an exterior shell of oval or egg-shaped form and of pleasing appearance. The complemental casing portions are secured together by a split clamping ring 17, the flanges of which straddle the respective flanges of the casing parts 10 and 16 and the end lugs 18 of which are interposed between the corresponding lugs 19 formed integral with the casing 10, a bolt 20 through the casing lugs and the clamping ring lugs, drawing said latter ring snugly in position for security of the casing element.

Within the hood 16 is mounted a generally conical lens holder and light tube 21. This holder has a flange 22 at its inner or larger end superposed over the corresponding flange 23 of the mirror 11 said two flanges provided respectively with bayonet slots 24 and 25 screws 26 through said bayonet slots securing the parts in assembled relation as shown.

Near the inner end of the lens holder is provided a condensing lens 27 of correspondingly large diameter which may be affixed in place by means of a split ring 28 in turn held by indentations 29 in the supporting shell, the lens being prevented from moving outward along the holder by reason of the conicity thereof. At the outer end the lens holder is cylindrical provided with a neck 30 which protrudes into a corresponding integral cylindrical neck 31 on the casing 16. A convex lens 32 is secured at the holder neck 30 between a friction ring 33 at one side thereof and a split ring 34 in a corresponding groove 35 at the other side thereof. A projecting lens 36 of the same diameter as lens 32 is firmly gripped between two friction rings 37 and 38 at opposite sides thereof within a holder sleeve 39 which sleeve is telescoped into the forward end of the casing 16 and fits snugly over the neck 30. The sleeve 39 is formed with a protruding visor part 40 affording an oblique edge and is adjustable with respect to lens 32 for proper divergence of the projected beam, and is located in any position of adjustment by means of the set screw 41. Preferably the sleeve 39 is formed with an integral stud 42 which is directed into a corresponding slot 43 longitudinally of the casing neck, whereby the visor is correctly positioned, the inner end of the hood 16 having an appropriate notch 44 coacting with a corresponding lug 45 on the clamping ring 17 to assure corresponding positioning thereof.

Preferably the lens holder 21 has the same convergence as the beam from the condensing lens 27, so that said beam will extend therein substantially along the wall of said holder. The interior of said wall has preferably a milk white surface, in order to avoid absorption of luminous energy. The lens 32 effects convergence to a focus F and the projecting lens 36 is preferably so disposed that the beam projected therefrom will diverge but little as best shown in Fig. 1. In Fig. 2 is shown diagrammatically the course of the rays from which the operation will be apparent. The visor while not absolutely necessary is desirable to suppress any rays that might pass above the desired maximum level.

In operation it will be noted that with the use of a lamp of the same candle power as common with headlights, I produce a beam of small divergence and therefore of effective penetrating power, in excess of that due to a diverging beam through a large aperture. The light passing successively through the three lenses of the system is also rendered mellow thereby so that even if the light is directed into the eyes of a person, it will not cause discomfort or interfere with vision. In fact, as shown in Figs. 1 and 2 the beam may have some rays deverging upward above the horizontal plane, which add to the visibility without producing glare. The two headlights are accordingly visible from a distance without the danger of blinding or dazzling an approaching driver.

It will thus be seen that there is herein described apparatus in which the several features of this invention are embodied, and which apparatus in its action attains the various objects of the invention and is well suited to meet the requirements of practical use.

As many changes could be made in the above construction, and many different embodiments of this invention could be made without departing from the scope thereof, it is intended that all matter contained in the above description or shown in the accompanying drawings shall be interpreted as illustrative and not in a limiting sense.

Having thus described my invention, what I claim as new, and desire to secure by Letters Patent is:

In a headlight, a lamp casing, a hood extending forwardly from said casing, the sides of said hood curving forwardly to a cylindrical outlet, said hood and said casing forming an enclosing shell, a light tube within said shell, said tube being conical throughout the greater portion of its length with the forward end thereof bent outward to cylindrical formation, said tube being supported at its ends by said shell, lenses within and adjacent each extremity of said tube but inset from the supported ends thereof, the portion of said tube between said lenses being spaced from said outer casing a substantial distance to permit heat expansion and distortion of said shell without affecting said tube.

Signed at New York, in the county of New York, and State of New York, this 1st day of February, A. D. 1926.

GEORGE RAWAK.